Feb. 15, 1938.                    D. F. SEARLE                      2,108,182
                              POWER BRAKE SYSTEM
                              Filed May 18, 1935            3 Sheets-Sheet 1

FIG. I.

INVENTOR:
DUDLEY F. SEARLE
BY
                ATTORNEY.

Feb. 15, 1938. D. F. SEARLE 2,108,182
POWER BRAKE SYSTEM
Filed May 18, 1935 3 Sheets-Sheet 2

INVENTOR:
DUDLEY F. SEARLE
BY
ATTORNEY

Feb. 15, 1938.    D. F. SEARLE    2,108,182
POWER BRAKE SYSTEM
Filed May 18, 1935    3 Sheets-Sheet 3

INVENTOR:
DUDLEY F. SEARLE
BY
ATTORNEY

Patented Feb. 15, 1938

2,108,182

UNITED STATES PATENT OFFICE 2,108,182

POWER BRAKE SYSTEM

Dudley F. Searle, Oakland, Calif.

Application May 18, 1935, Serial No. 22,164

4 Claims. (Cl. 303—89)

This invention relates to improvements in power brake systems and more particularly to brake locks and control valves therefor.

Considerable difficulty has been experienced in prior air brake systems installed in truck trailers in that the brakes become inoperative after the trailer is uncoupled from the truck. The makeshift arrangements, such as blocking the wheels, resorted to in order to maintain the uncoupled trailer stationary present a source of danger as well as inconvenience especially when the truck and trailer are parked on an incline.

The principal object of this invention is to provide a simple and effective parking lock for power brakes.

Another object is to provide for coordinated control of the brakes and the lock.

Another object is to safeguard against unintentional application of the brake lock.

Another object is to provide a brake lock requiring only the usual air hose connections between the truck and trailer for its operation.

Another object is to provide a durable and reliable apparatus for the purpose at minimum cost.

Other objects and advantages appear as this description progresses.

In this specification and the accompanying drawings, the invention is disclosed in its preferred form. It is, however, to be understood that the invention is not limited to this form because modifications may be made within the purview of the claims following the description.

Figs. 5 to 9 inclusive are diagrammatic views showing the various operating positions of the control valve.

Figure 1:
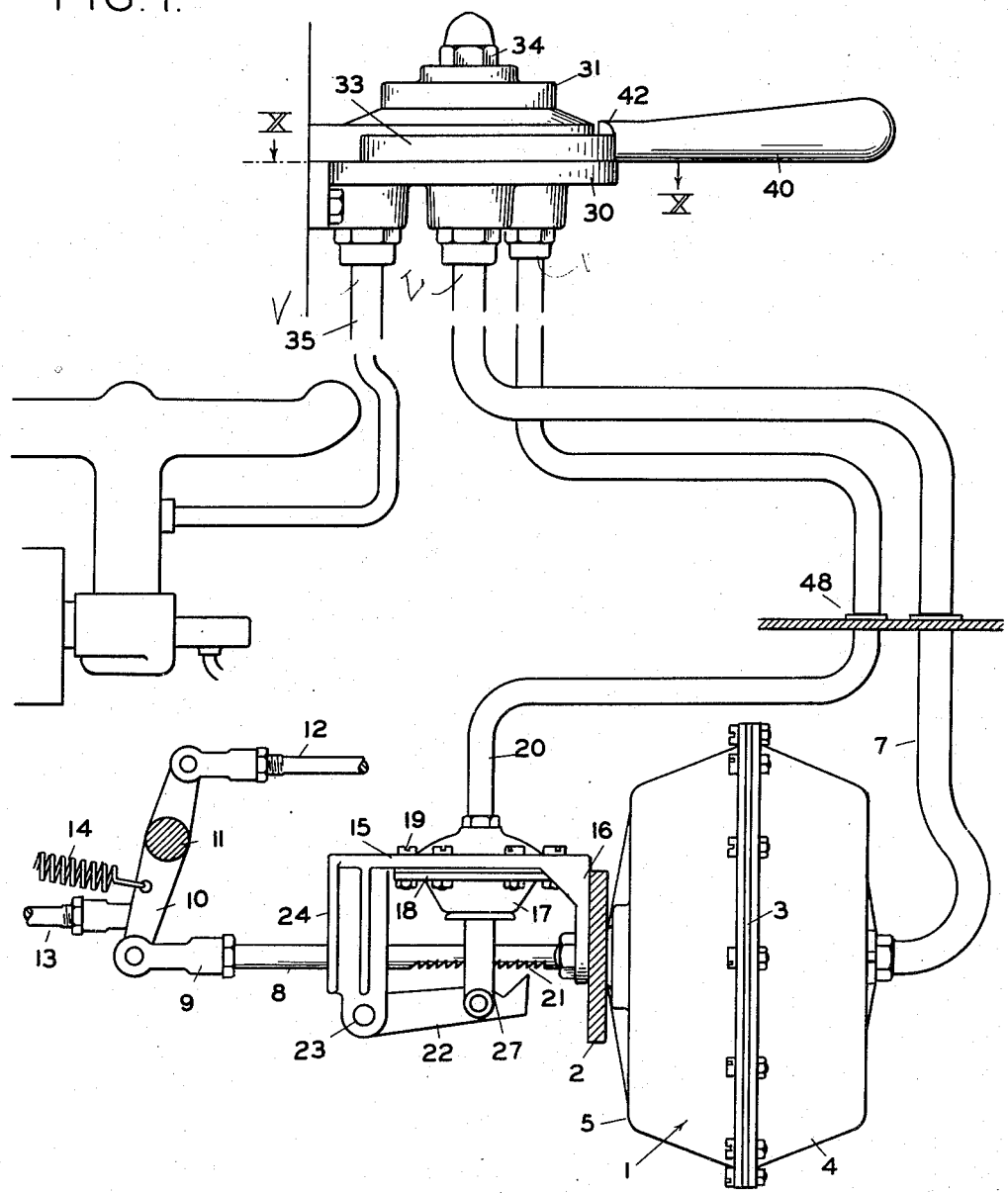
Fig. 1 is a diagrammatic side elevation of an air brake system having the present invention incorporated therein.
Figure 10:
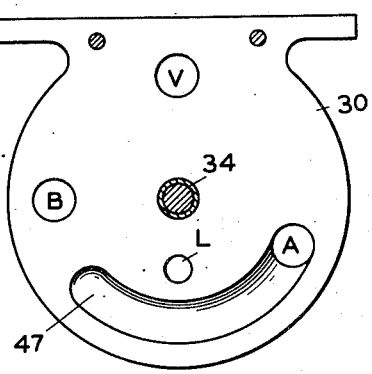

Fig. 10 is a horizontal section of the control valve taken along the line X—X in Fig. 1 and showing the valve ports.

The invention is shown incorporated in a brake system operated by the sub-atmospheric pressure of the intake manifold of an internal combustion motor. It will be obvious to those skilled in the art that the invention is equally applicable to fluid pressure systems operating at pressures above atmospheric.

Figure 2:
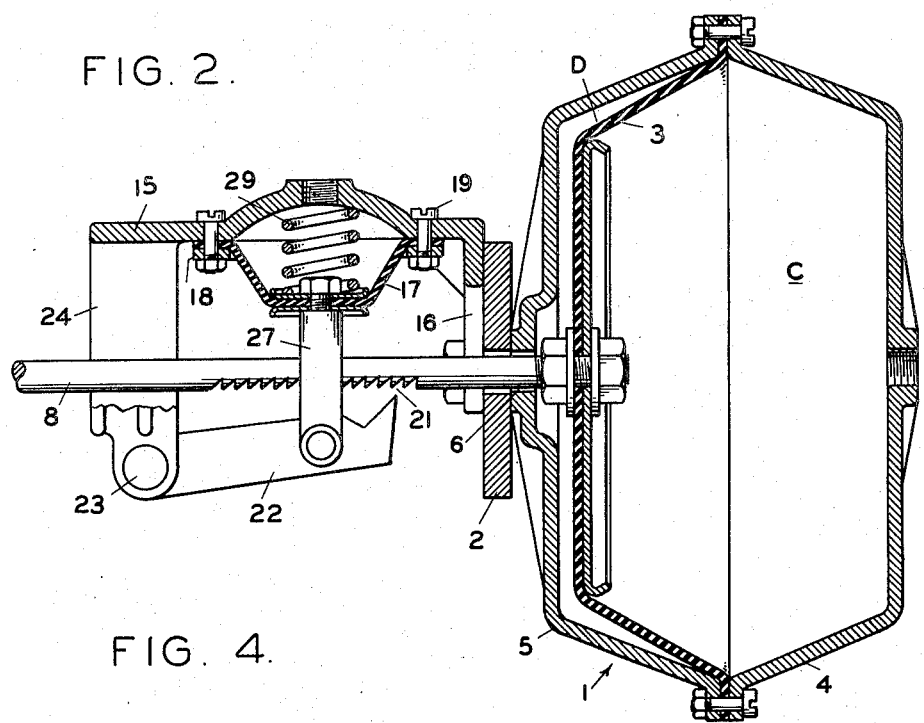
Fig. 2 is a vertical section of the brake power cylinder and brake lock.

In detail, the construction illustrated in the drawings, referring more particularly to Figs. 1 and 2, comprises the power chamber 1 mounted on the cross bar 2 on the vehicle. The flexible diaphragm 3 divides the power chamber into two compartments C and D and has its margins confined between the opposed flanges of the shells 4 and 5 which are bolted together to form the power chamber. The compartment D has the port 6 communicating with the atmosphere. The hose 7 leads from the compartment C to the brake control valve.

The pull rod 8 is operatively connected to the diaphragm 3 and extends through the opening 6 of the power chamber 1. The opposite end of the rod 8 has the clevis 9 thereon pivoted to the lever arm 10 on the cross shaft 11. The rods 12 and 13 connected to levers at the opposite ends of the shaft 11 extend to the usual wheel brakes (not shown). The spring 14 contracting between the lever arm 10 and the chassis serves to urge the brakes into the inactive position.

The brake lock unit consists of the plate 15 having the lugs 16 bolted to the bar 2 (see Fig. 2). The collapsible cup 17 has its margins sealed to the plate 15 by the clamping ring 18 and the screws 19. The hose 20 communicates with the interior of the cup 18 and leads to the control valve.

The underside of the pull rod 8 has the ratchet teeth 21 therein. The pawl 22 is pivoted at 23 on the yoke 24 extending from the plate 15 and is engageable with the ratchet teeth 21. The clevis 27 is mounted on the collapsible cup 17 and is operatively connected to the pawl 22. The spring 29 expanding within the cup 17 against the plate 15 serves to maintain the pawl 22 normally out of engagement with the ratchet 21.

Figure 4:
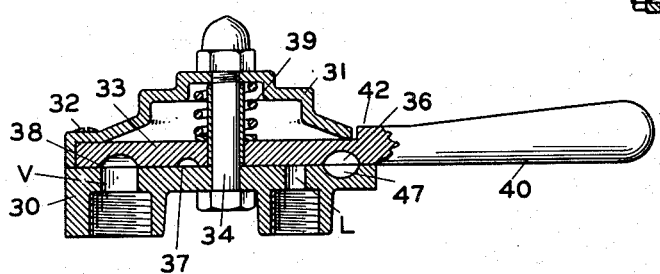
Fig. 4 is a vertical section of the same taken along the line IV—IV in Fig. 3.
Figure 3:
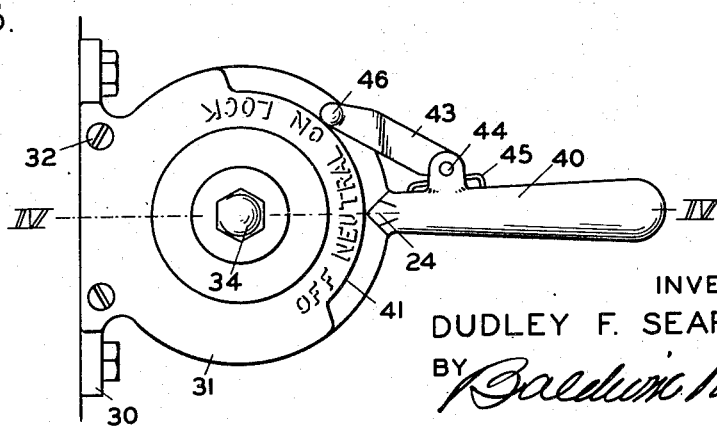
Fig. 3 is a plan view of the control valve.

The control valve, see also Figs. 3 and 4, has the body 30 bolted to the instrument panel or other support within convenient reach of the driver. The cover 31 is secured to the body 30 by the screws 32. The valve disk 33 is interposed between the cover 31 and the body 30 and pivots on the axial bolt 34 which extends through the body and cover.

The hoses 7 and 20 leading from the power chamber 1 and the collapsible cup 17 of the brake lock communicate with the ports B and L (see also Fig. 10) in the valve body 30. The port V in the body 30 is connected to the intake manifold of the motor by the pipe 35. The port A is open to the atmosphere. The valve disk 33 has the recesses 36, 37, and 38 therein arranged to cooperate with the several ports in the body 30. The abutting surfaces of the body 30 and the disk 33 are precision lapped to a smooth surface. The spring 39 encircling the bolt 34 expands between the cover 31 and the disk 33 to urge the sliding surfaces of the block and body into sealing engagement to prevent loss of fluid pressure.

The disk 33 has the operating handle 40 extending laterally therefrom. The arcuate slot 41 in the cover 31 receives the index 42 projecting from the handle 40. Appropriate legends on the cover indicate the various operating positions for the control handle 40.

The dog 43 is pivoted at 44 on the handle 40 and is arranged to abut the end of the slot 41 to limit the operative movement of the control handle. The spring 45 normally maintains the dog in engagement with the slot 41. The dog 43 has the finger lug 46 thereon so that it may be moved outward from the slot 41 to permit full operative movement of the handle 40.

Figure 5:
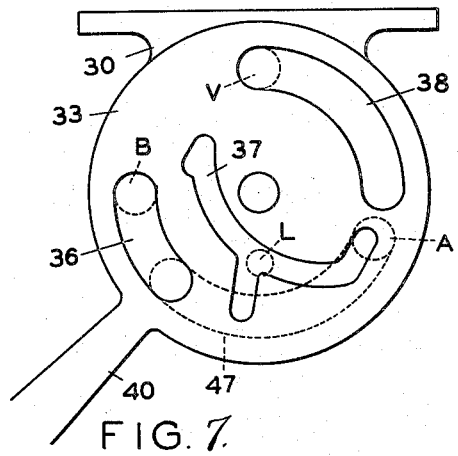

The apparatus operates substantially as follows: when the control handle is in the "off" position, the recesses 36, 37 and 38 in the valve disk occupy positions with respect to the ports A, V, B, and L in the valve body as illustrated in Fig. 5. The atmospheric port A has the lateral extension 47, see also Fig. 10. The recess 36 in the valve disk overlaps the extremity of the extension 47 and the port B communicating with the compartment C of the brake power chamber 1. With atmospheric pressure in both compartments of the power chamber, the brakes remain inoperative.

The recess 37 provides communication between the atmospheric port A and the port L leading to the collapsible cup 17 of the brake lock. The spring 29 retains the pawl 22 out of engagement with the ratchet 21.

Figure 7:
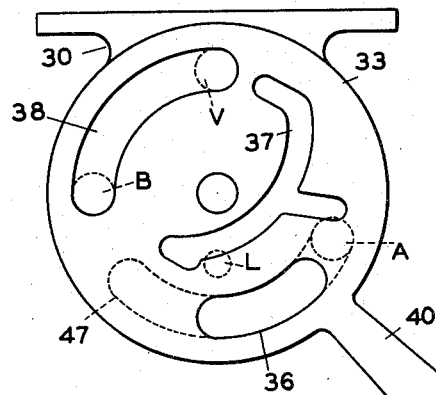

Then the handle 40 is swung into the "on" position, as in Fig. 7, to apply the brakes, the port B is cut off from the atmosphere and brought into communication with the port V by the rotation of recesses 36 and 38. The intake manifold then partially evacuates the compartment C of the power chamber 1 through the pipe 35, the recess 38 and the hose 7. The atmospheric pressure within the compartment D then reacts on the diaphragm 3 pulling the rod 8 to apply the brakes.

Figure 6:
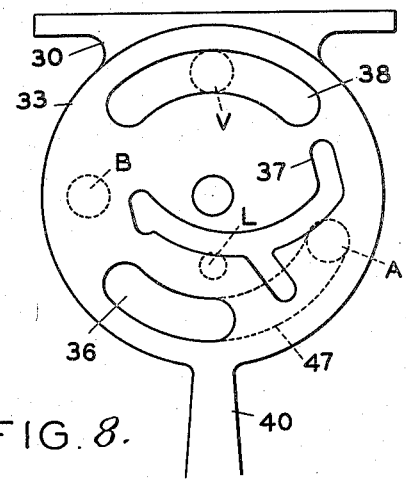

The control handle 40 is swung into the intermediate "neutral" position illustrated in Fig. 6 when the brakes are applied to the desired extent. This rotates the recess 38 to close the port B. The pressure in compartment C of the power chamber is thus stabilized and the brakes held continuously applied to the selected extent.

Swinging the handle 40 back into the "off" position, shown in Fig. 5 releases the brakes since the travel of the recess 36 into registry with the port B restores atmospheric pressure to the power chamber 1 rendering the brakes inactive.

The brakes may be thus operated in the usual manner independent of the brake lock mechanism. The dog 43, by abutting the end of the slot 41 prevents the handle 40 being accidentally swung past the "on" braking position during the normal operation of the vehicle.

To operate the brake lock, the handle 40 is first swung into the "on"' position to fully apply the brakes in the manner above described. The dog 43 is then moved out of the slot 41 by means of the finger lug 46 and the handle 40 is swung toward the "lock" position.

Figure 8:
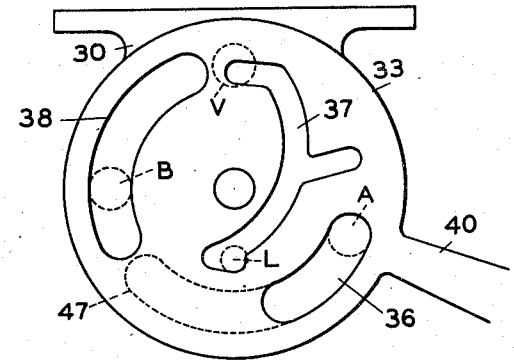
Figure 9:
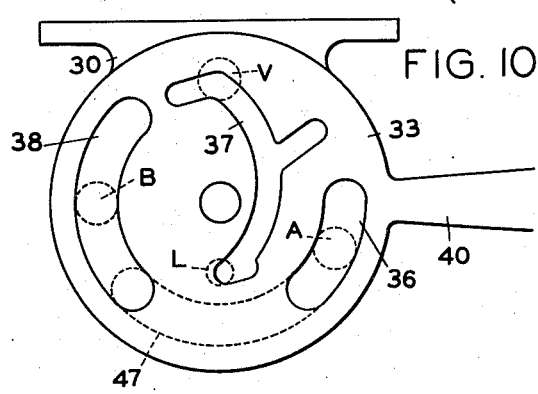

The first portion of this movement rotates the recess 37 as shown in Fig. 8 and provides communication between the ports V and L. This connects the intake manifold through the pipe 35 and the hose 20 to the flexible cup 17. The cup is quickly exhausted by the intake manifold and collapsed by the atmospheric pressure on its exterior. This raises the pawl 22 into engagement with the ratchet teeth 21 on the pull rod 8.

The movement of the handle 40 also rotates the recess 38, see Fig. 8, and cuts off the power chamber port B from the port V. The continuation of the movement of the handle toward the "lock" position, see Fig. 9, rotates the recess 38 into registry with the extension 47 of the atmospheric port A. This admits atmospheric pressure into the compartment C of the power chamber. The spring 14 tends to release the brakes and the pull rod 8 begins to move backward. However, the pawl 22, being engaged in one of the ratchet notches 21 locks the rod 8 against further movement. The brakes applied to the maximum extent are thus locked in active position.

The trailer may be then uncoupled from the truck in the usual manner and the hoses 7 and 20 disconnected at 48 as in Fig. 1. The ratchet notches 21 are slightly undercut so as to positively prevent disengagement of the pawl 22 therefrom when the subatmospheric pressure in the cup 17 is relieved. When the trailer is again coupled to the truck, the hoses 7 and 20 are reconnected. The handle 40 is first moved into the "on" position. The subatmospheric pressure thus produced in the compartment C of the power chamber slightly moves the pull rod 8. This releases the nose of the pawl 22 from its locked engagement with the undercut ratchet notches 21. The spring 29 then lowers the pawl 22 from engagement with the ratchet 21. The brake system of the trailer and truck may be then operated in the manner previously described.

Having thus described this invention, what is claimed and desired to secure by Letters Patent is:

1. A power brake system including a source of fluid pressure; braking means actuated by said fluid pressure; locking means actuated by the fluid pressure and adapted to lock said braking means in operative position; a control valve interposed between said fluid pressure source and said braking and locking means and having an operating handle movable to admit the fluid pressure into said braking and locking means selectively; and a movable dog normally preventing the necessary movement of said handle to admit fluid pressure into said locking means.

2. A power brake system including a source of fluid pressure; braking means actuated by said fluid pressure; under cut ratchet teeth associated with said braking means; locking means including a pawl engageable with said ratchet teeth to lock said braking means and means actuated by said fluid pressure for operating said pawl; a control valve having an outlet therein interposed between said fluid pressure source and said braking and locking means and movable to successively admit fluid pressure to said braking means, then to admit fluid pressure to the locking means and finally to relieve the fluid pressure in the braking means through said outlet; said under cut ratchet teeth preventing release of said locking pawl after the fluid pressure in said braking means has been relieved.

3. A power brake system including braking means; a source of subatmospheric air pressure; a cross bar, a power chamber fixed on said cross bar and connected to said subatmospheric pressure source and operative to apply said brakes; ratchet teeth associated with said braking means; and locking means including a plate fixed on said crossbar in juxtaposition to said power chamber and extending longitudinally therefrom; a pawl supported by said plate and engageable with said ratchet teeth; a collapsible cup sealed on said plate and operatively connected to said pawl; a manual control valve connected to said subatmospheric air pressure source and having said collapsible cup connected thereto; and resilient means for holding said pawl out of engagement with said ratchet teeth until said pawl is operated by the collapse of said cup.

4. A power brake system including braking means, a source of subatmospheric air pressure; a cross bar; a power chamber fixed on said cross bar and connected to said subatmospheric pressure source; a pull rod extending from said power chamber through said cross bar and adapted to apply said brakes when actuated by said power chamber; ratchet teeth on one side of said pull rod; and locking means including a plate fixed on said cross-bar immediately opposite said power chamber and extending longitudinally therefrom alongside said pull rod opposite said ratchet teeth; a yoke extending from said plate; a pawl pivoted in said yoke and engageable with said ratchet teeth; a collapsible cup sealed on said plate and having said pawl operatively connected thereto, a manual control valve connected to said subatmospheric air pressure source and having said collapsible cup operatively connected thereto, and resilient means for holding said pawl out of engagement with said ratchet teeth until said pawl is operated by the collapse of said cup.

DUDLEY F. SEARLE.